July 13, 1943.  W. T. KNAUTH  2,324,217
TEMPERATURE COMPENSATOR
Filed April 20, 1942
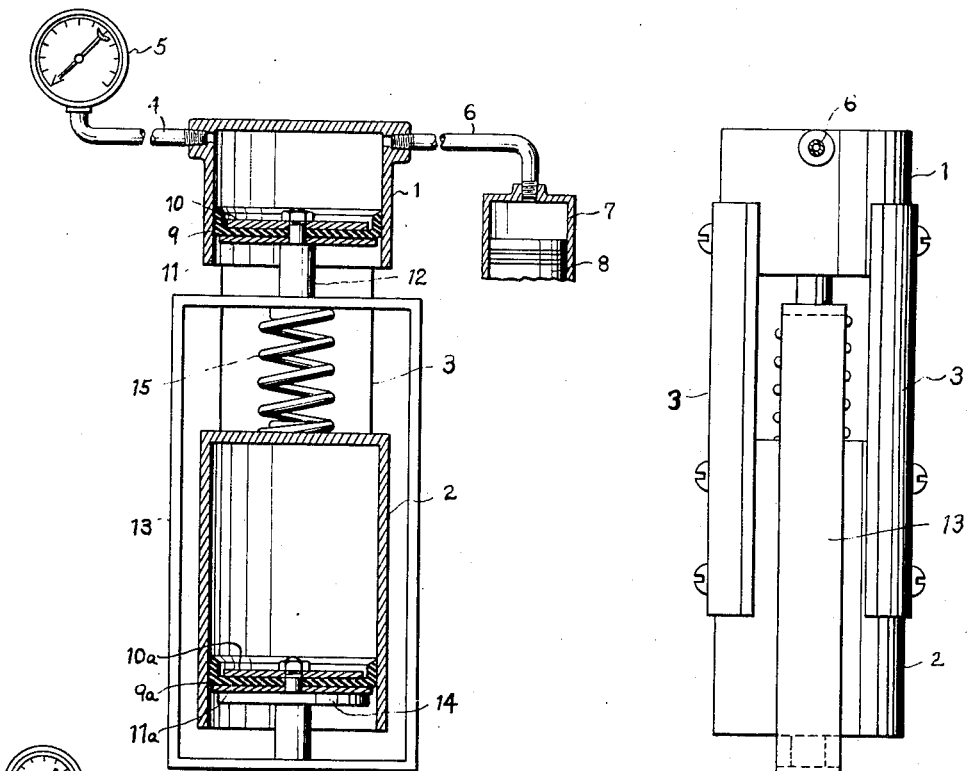
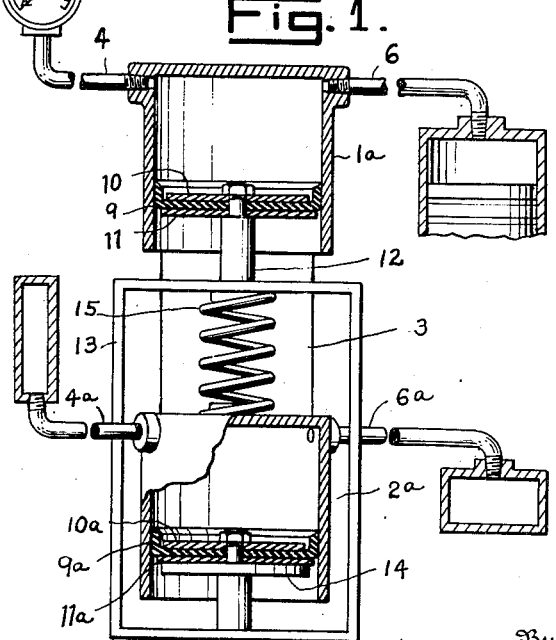
Inventor
WALTER T. KNAUTH
By E. V. Hardway
Attorney Patented July 13, 1943

2,324,217

UNITED STATES PATENT OFFICE 2,324,217

TEMPERATURE COMPENSATOR

Walter T. Knauth, Houston, Tex., assignor to The Milwhite Company Inc., a corporation Application April 20, 1942, Serial No. 439,705

3 Claims. (Cl. 73—151)

This invention relates to a temperature compensator.

An object of the invention is to provide, in a closed fluid system, equipment for compensating for changes in the volume of the fluid in the system due to changes in atmospheric temperatures.

Another object of the invention is to provide equipment of the character described having a closed fluid system with a fixed and definite volumetric capacity, with an arrangement whereby the volumetric capacity of the enclosure for the fluid is varied to accommodate for changes in volume of fluid due to ambient temperature changes.

The invention herein described has been disclosed in my copending application for Means for measuring and recording liquid density, filed June 16, 1941, under Serial Number 398,190 and which resulted in Patent No. 2,284,060 dated May 26, 1942. The present application constitutes a continuation-in-part of said copending application.

With the above and other objects in view the invention has particular relation to certain novel features of construction, operation and arrangement of parts, an example of which is given in this specification and illustrated in the accompanying drawing wherein:

Figure 1 shows a sectional view of one embodiment of the compensator.

Figure 2 shows a side elevation thereof taken at right angles to the view shown in Figure 1, and Figure 3 shows a sectional view of a slightly modified embodiment.

Referring now more particularly to the drawing wherein like numerals of reference designate the same parts in each of the figures, the numerals 1 and 2 designate cylinders which are maintained in fixed relation by means of suitable brackets 3, 3 to which the cylinders are secured in any preferred manner.

The cylinder 1 is connected into a closed fluid system which, in the present illustration, includes the conductor 4 which is connected into the gauge 5 and the conductor 6 which is connected into a pressure cylinder 7 having a piston 8 therein.

It is to be understood, however, that the compensator is applicable to any closed fluid system wherein the volumetric capacity of the enclosure for the fluid is varied in accordance with changes of the volume of fluid due to ambient changes in temperature.

In the cylinders 1, 2 are similar pistons which, in the present illustration, comprise cup rings 9, 9a, being reenforced by the plates 10, 11 and 10a, 11a, respectively. The piston in the cylinder 1 is attached to a piston rod 12 which is also attached to a frame 13. Upstanding from the lower end of the frame, there is a stop 14, on which the piston in the cylinder 2 normally rests.

The cylinder 1 is filled with glycerine which forms a part of the pressure system with which said cylinder is connected. The cylinder 2 is also filled with glycerine. In the illustration disclosed in Figure 1, the volume of fluid in the cylinder 2 is the same as the volume of fluid in the cylinder 1 plus the total volume of fluid in the fluid pressure system and the areas of the pistons are the same. These cylinders, pistons and their connections form a temperature compensator. As the atmospheric temperature increases, the volume of fluid in the cylinder 2 increases thereby forcing the corresponding piston downwardly causing a corresponding downward movement of the frame 13 and the piston in the cylinder 1 connected thereto, thus increasing the volume of the cylinder 1 to allow for the expansion of the fluid in the system due to an increase in temperature thereof. Upon such downward movement of the frame 13, a spring 15, interposed between the upper end of the frame and the cylinder 2 will be compressed.

Upon a reduction in atmospheric temperature, the compression spring 15 will force the frame 13 as well as both pistons, upwardly, so as to decrease the capacity of the cylinder 1 in proportion to the decrease in volume of the fluid in the pressure system.

In the embodiment illustrated in Figure 3, the cylinders 1a and 2a are of the same volume and are connected into comparable closed fluid systems by means of the conductors 4, 6 as shown in Figure 1, and the conductors 4a, 6a. In other respects, the embodiment shown in Figure 3 is the same as that shown in Figure 1. As hereinabove stated, the volume of fluid in the cylinder 1 together with that in the connected closed system is the same as the total volume of fluid in the cylinder 2. This construction is satisfactory if both volumes are exposed to the same temperature so that the volume changes will be the same. If, however, the closed system, as disclosed in Figure 1, has its volume distributed to various parts of which some parts are exposed to different temperature changes, the lower cylinder as 2a may be made of the same size as the top cylinder 1a and connected to an auxiliary system comparable to the closed system with respect to total volume, volume distribution and temperature exposure.

What I claim is:

1. A closed fluid filled system provided with a temperature compensator, said temperature compensator comprising two fixed cylinders having pistons therein and each being closed at one end with fluid filling the cylinders between the closed end and the pistons, a frame connecting the two pistons whereby they are reciprocable in unison, a resilient element biasing the frame to urge the pistons against the fluids in the cylinders, one of said cylinders being connected to said closed fluid filled system and the fluid contained in the cylinder not connected to the closed system having a temperature co-efficient of expansion so that changes in ambient temperature will cause movement of the two pistons to change the volumetric capacity of the cylinder connected to the closed system substantially equal to the change in volume of the fluid contained in the closed system and the cylinder connected thereto due to corresponding changes in ambient temperature.

2. A closed fluid filled system provided with a temperature compensator, said temperature compensator comprising two non-resilient cylinders closed at one end and fixed in position relative to one another, pistons in the cylinders, fluid filling the cylinders between the closed ends and the pistons, a frame connecting said pistons so that the pistons are reciprocable in unison and means biasing the frame and constantly tending to urge the pistons against the fluids in the cylinders, an auxiliary fluid filled system composed of non-resilient elements which are substantially comparable to any and all elements which may compose the said closed system with respect to volumetric capacities and thermal exposure, one of said cylinders being connected to the closed fluid filled system and the other being connected to the auxiliary fluid filled system whereby variations in volume of the fluid in the auxiliary system and the cylinder connected thereto, due to changes in ambient temperature, will cause movement of the two pistons to change the volumetric capacity of the cylinder connected to the closed system substantially equal to the variations in volume of the fluid in the closed system and the cylinder connected thereto due to corresponding changes in ambient temperatures.

3. A closed fluid filled system provided with a temperature compensator, said temperature compensator comprising two non-resilient cylinders each closed at one end and fixed in position relative to one another, pistons in the cylinders, fluid filling the cylinders between the closed ends and the pistons, a frame connecting said pistons so that the pistons are reciprocable in unison, an auxiliary fluid filled system composed of non-resilient elements, which are substantially comparable to any and all elements which may compose the said closed system with respect to volumetric capacities and thermal exposure, one of the cylinders being connected to the closed fluid filled system and the other being connected to the auxiliary fluid filled system, a spring biasing the frame to urge the pistons against the fluids in the cylinders whereby said spring will, with thermal contraction of the fluid in the auxiliary system and the cylinder connected thereto due to changes in ambient temperature, cause movement of the two pistons to change the volumetric capacity of the cylinder connected to the closed system substantially equal to the thermal contraction of the fluid in the closed system and the cylinder connected thereto due to corresponding changes in ambient temperature.

WALTER T. KNAUTH.